US010003558B2

(12) United States Patent
Gatti et al.

(10) Patent No.: US 10,003,558 B2
(45) Date of Patent: Jun. 19, 2018

(54) ELECTRONIC MAIL ATTACHMENT HOLD AND DISPATCH FOR SECURITY MONITORING

(71) Applicant: BANK OF AMERICA CORPORATION, Charlotte, NC (US)

(72) Inventors: Benjamin Lorenzo Gatti, Lake Park, NC (US); Jamison William Scheeres, Charlotte, NC (US); David Joseph Walsh, Fort Mill, SC (US); Nicholas Edward Peach, Charlotte, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 259 days.

(21) Appl. No.: 14/871,566

(22) Filed: Sep. 30, 2015

(65) Prior Publication Data
US 2017/0093768 A1 Mar. 30, 2017

(51) Int. Cl.
*H04L 12/58* (2006.01)
(52) U.S. Cl.
CPC ............ *H04L 51/08* (2013.01); *H04L 51/063* (2013.01); *H04L 51/12* (2013.01)
(58) Field of Classification Search
CPC ........ H04L 51/08; H04L 51/063; H04L 51/12
See application file for complete search history.

(56) References Cited

U.S. PATENT DOCUMENTS

| 5,832,208 | A | * | 11/1998 | Chen | ..................... G06F 21/564 709/206 |
|---|---|---|---|---|---|
| 7,072,947 | B1 | | 7/2006 | Knox et al. | |
| 7,076,533 | B1 | | 7/2006 | Knox et al. | |
| 7,409,425 | B2 | | 8/2008 | Naick et al. | |
| 7,840,642 | B2 | | 11/2010 | Naick et al. | |
| 7,865,548 | B2 | | 1/2011 | Chen et al. | |
| 8,280,967 | B2 | | 10/2012 | Almeida | |
| 8,606,867 | B2 | | 12/2013 | Deshpande et al. | |
| 8,838,718 | B2 | | 9/2014 | Almeida | |
| 2011/0119771 | A1 | * | 5/2011 | Postoyko | ............ G06F 21/6209 726/28 |
| 2012/0131433 | A1 | * | 5/2012 | Tiwari | .................... H04L 51/08 715/229 |

(Continued)

Primary Examiner — Brian J Gillis
Assistant Examiner — Amy Ling
(74) Attorney, Agent, or Firm — Michael A. Spings; Moore & Van Allen PLLC; James C. Edwards

(57) ABSTRACT

Systems, apparatus, and computer program products provide for electronic mail (email) attachment hold and dispatch for security monitoring of email attachments. Specifically, embodiments of the invention provide for removing email attachments from emails containing such, holding the removed attachments in storage prior to delivering the email to the recipient and communicating the email to the intended recipient absent the attachment, but rather with a link or other means by which the email recipient can retrieve the attachment from the storage. Such a procedure not only allows for the attachment to be analyzed for threats prior to transferring the attachment to the email recipient, but also provides for a means by which information pertaining to the retrieval of the attachment is logged (e.g., who retrieved the attachment, from which computing device was the attachment retrieved, at what date and time was the attachment retrieved and the like).

17 Claims, 3 Drawing Sheets

(56) References Cited

U.S. PATENT DOCUMENTS

2012/0151379 A1* 6/2012 Schultz .................. H04L 51/08
715/752
2015/0264111 A1* 9/2015 Aleksandrov ........... H04L 51/08
726/4

* cited by examiner

ELECTRONIC MAIL ATTACHMENT HOLD AND DISPATCH FOR SECURITY MONITORING

FIELD

In general, embodiments of the invention relate to computing network communications and, more particularly, systems for holding electronic mail (email) attachments in storage prior to dispatching the email attachment to the intended recipient for security monitoring purposes.

BACKGROUND

Exploitable defects in popular operating systems and/or software applications are the means by which computer hackers penetrate network perimeters within enterprises and other computer network domains. Quite often, such malicious exploits make use of electronic mail (email) attachments as the means by which the attack on the targeted network occurs. Targeted networks can expect to be exposed to various levels of attachment-bound exploit attempts on an ongoing basis. As such, it is imperative, in the event that such an attack is not caught at the onset, to understand which computing devices have been exposed to the attachment (i.e., which recipients opened the attachment). Since most email applications do not provide a "read" flag for attachments, it is not currently possible to determine whether or not an attachment has been opened/read by the email recipient.

Therefore, a need exists to develop systems, apparatus, methods, computer program products and the like that provide for security monitoring of email attachments. In this regard, the desired systems and the like should provide for conducting security analysis upon receipt by the network domain and prior to dispatching the associated email to the intended email recipient's mailbox. Moreover, since virus definitions can change/evolve rapidly, desires systems and the like should provide for additionally conducting security at the time the email recipient accesses the attachment. In addition, desired systems and the like should provide a means for logging information associated with the email recipient accessing/reading the attachment, such as which user/recipient accessed the attachment, on which computing device was the email attachment retrieved/opened, the date and time at which the email attachment was retrieved/opened and the like. Such information would be highly instrumental in investigating the significance and timing of network attacks and the like.

SUMMARY OF THE INVENTION

The following presents a simplified summary of one or more embodiments in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing apparatus, computer program products or the like for electronic mail (email) attachment hold and dispatch for security monitoring of email attachments. Specifically, embodiments of the invention provide for removing email attachments from emails containing such, holding the removed attachments in storage prior to delivering the email to the recipient and communicating the email to the intended recipient absent the attachment, but rather with a link or other means by which the email recipient can retrieve the attachment from the storage. Such a procedure not only allows for the attachment to be analyzed for threats immediately prior to transferring the attachment to the email recipient, but also provides for a means by which the retrieval by the recipient is logged (e.g., who retrieved the attachment, from which computing device was the attachment retrieved, at what date and time was the attachment retrieved and the like) for use by security personnel responding to an attachment bound exploit.

A system for electronic mail (email) attachment hold and dispatch defines first embodiments of the invention. The system comprises an attachment storage having a first memory and at least one first processor in communication with the first memory. The system additionally includes one or more email servers having a second memory and at least one second processor in communication with the second memory. In addition the system includes an email attachment hold and dispatch module that is stored in the second memory and executable by the second processor. The module is configured to, upon receipt of emails by the email server, identify emails that include attachments, remove the attachments from the emails and store the attachments in the first memory of the attachment storage. The module is further configured to reconfigure the emails to include access to an electronic link to the attachment and communicate the reconfigured emails to electronic mailboxes of associated email recipients. Further, the module is configured, in response to the email recipients activating the electronic link from a computing device, transfer the email attachment from the first memory of the attachment storage to the computing device. Additionally the system includes an email attachment access logging module stored in the second memory, executable by the second processor and configured to log information associated with the email recipient activating the electronic link to transfer the email attachment from the first memory of the attachment storage to the computing device. In such embodiments of the system.

In specific embodiments the system includes an email attachment analysis module stored in the second memory executable by the second processor and configured to access the first memory of the attachment storage to analyze the email attachments for suspicious content upon receipt of the email attachments in the first memory. In other embodiments of the system the email attachment analysis module is further configured to access the first memory of the attachment storage to analyze the email attachments for suspicious content in response to the email recipients activating the electronic link and prior to transferring the email attachment from the first memory of the attachment storage to the computing device.

In other specific embodiments the system the logged information may include, but is not limited to, of identity of individual that transferred the email attachment, identity of the computing device to which the email attachment was transferred and date and time that the email attachment was transferred.

In specific embodiments of the system, the email attachment hold and dispatch module is further configured to reconfigure the emails by embedding the electronic link to the attachment in the email. In such embodiments of the system, in which the link is embedded in the email, the email attachment hold and dispatch module may be further configured to include an empty payload attachment in the email to notify the email recipient that the email includes an attachment or, otherwise, set an indicator flag in the email to notify the email recipient that the email includes an attachment.

In further specific embodiments of the system, the email attachment hold and dispatch module is further configured to reconfigure the emails by (i) creating secondary attachments that includes an interstitial message having the electronic link included in the interstitial message, and (ii) including the secondary attachment with the email.

In yet other specific embodiments of the system, the email attachment hold and dispatch module is further configured to, in response to an email recipient activating the electronic link prior to the email attachment analysis module completing the analysis of the email attachment, alert the email recipient that the attachment is currently inaccessible.

A computer-implemented method for electronic mail (email) attachment hold and dispatch defines second embodiments of the invention. The method includes, upon receiving emails at an email server, identifying emails that include attachments, removing the attachments from the emails and storing the attachments in an attachment storage device. The method further includes reconfiguring the emails to include access to an electronic link to the attachment and communicating the reconfigured emails to electronic mailboxes of associated email recipients. In addition, the method includes, in response to the email recipients accessing the emails and activating the electronic link, transferring the email attachment from the attachment storage device a computing device from which the email recipient activated the electronic link. Additionally the method includes logging information associated with the email recipient activating the electronic link to transfer the email attachment from the attachment storage device to the computing device.

In specific embodiments the method further includes, in response to storing the attachments in the attachment storage device, accessing, by a computing processor, the attachment storage device to analyze the email attachments for suspicious content. In additional related embodiments the method further includes, in response to the email recipients activating the electronic link and prior to transferring the email attachment from the first memory of the attachment storage to the computing device, accessing the attachment storage device to analyze the email attachments for suspicious content.

In additional embodiments the method the information that is logged may include, but is not limited to, identity of individual that transferred the email attachment, identity of the computing device to which the email attachment was transferred and date and time that the email attachment was transferred.

In other embodiments of the method reconfiguring the emails further includes reconfiguring the emails by embedding the electronic link to the attachment in the email. In such embodiments of the method, reconfiguring the emails may further include reconfiguring the emails by one of (i) including an empty payload attachment in the email to notify the email recipient that the email includes an attachment or (ii) creating secondary attachments that includes a interstitial message having the electronic link included in the interstitial message, and including the secondary attachment with the email.

A computer program product including a non-transitory computer-readable medium defines third embodiments of the invention. The computer-readable medium includes a first set of codes for causing a computer to upon receiving emails at an email server, identifying emails that include attachments and a second set of codes for causing a computer to remove the attachments from the emails and store the attachments in an attachment storage device. In addition, the computer-readable medium includes a third set of codes for causing a computer to reconfigure the emails to include access to an electronic link to the attachment. The computer readable-medium additionally includes a fourth set of codes for causing a computer to communicate the reconfigured emails to electronic mailboxes of associated email recipients and a fifth set of codes for causing a computer to, in response to the email recipients accessing the emails and activating the electronic link, transfer the email attachment from the attachment storage device a computing device from which the email recipient activated the electronic link. Further, the computer readable-medium includes a sixth set of codes for causing a computer to log information associated with the email recipient activating the electronic link to transfer the email attachment from the attachment storage device to the computing device.

Thus, systems, apparatus, methods, and computer program products herein described in detail below provide for holding and subsequent dispatching of electronic mail (email) attachment for security monitoring of email attachments. Specifically, embodiments of the invention provide for removing email attachments from emails containing such and holding the removed attachments in storage prior to delivering the email to the recipient. The emails are subsequently communicated to intended recipient absent the attachment, but rather with a link or other means by which the email recipient can retrieve the attachment from the storage. Such a procedure not only allows for the attachment to be analyzed for threats prior to transferring the attachment to the email recipient, but also provides for a means by which information related to the retrieval by the recipient is logged for use by security personnel responding to an attachment bound exploit.

To the accomplishment of the foregoing and related ends, the one or more embodiments comprise the features hereinafter fully described and particularly pointed out in the claims. The following description and the annexed drawings set forth in detail certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Figure 1:
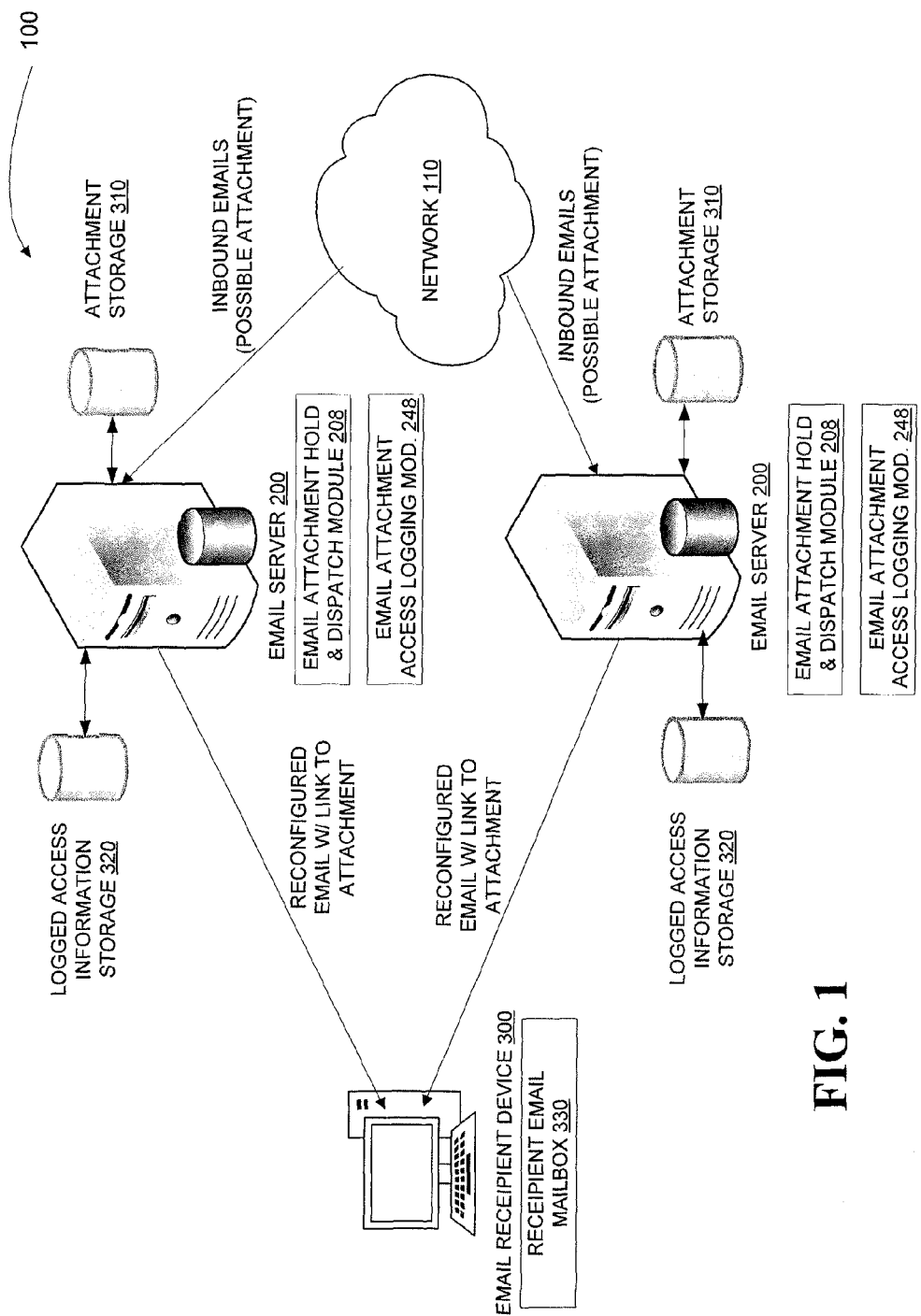
Figure 2:
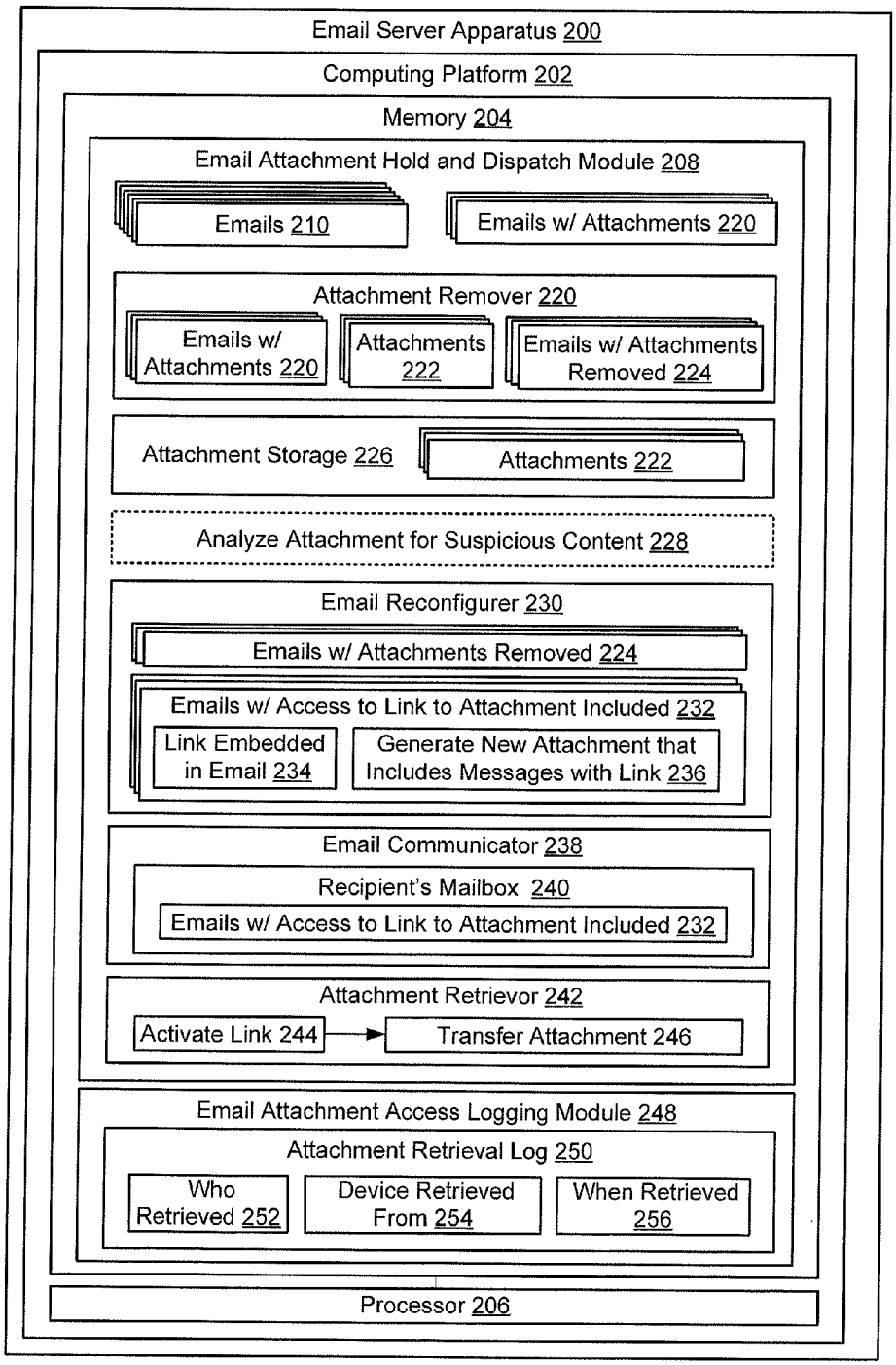
Figure 3:
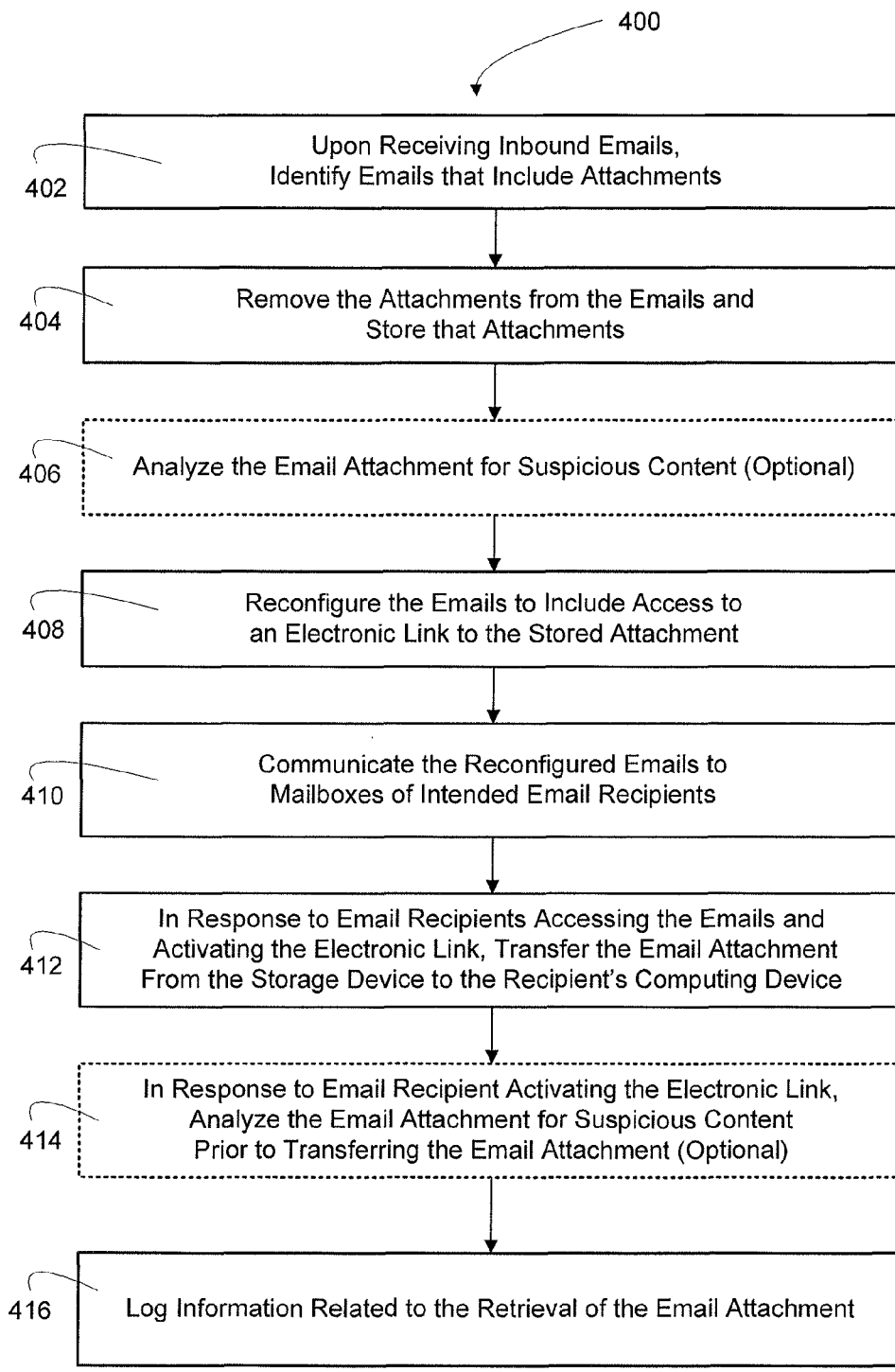

Having thus described embodiments of the invention in general terms, reference will now be made to the accompanying drawings, which are not necessarily drawn to scale, and wherein:

FIG. 1 provides a schematic diagram of a system for holding and dispatching email attachments and logging the results of retrieval of the email attachments, in accordance with embodiments of the present invention;

FIG. 2 provides a block diagram of an apparatus configured for holding and dispatching email attachments for security purposes, in accordance with embodiments of the present invention; and FIG. 3 provides a flow diagram of a method for holding and dispatching email attachments, in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout. Although some embodiments of the invention described herein are generally described as involving a "financial institution," one of ordinary skill in the art will appreciate that the invention may be utilized by other businesses that take the place of or work in conjunction with financial institutions to perform one or more of the processes or steps described herein as being performed by a financial institution.

As will be appreciated by one of skill in the art in view of this disclosure, the present invention may be embodied as an apparatus (e.g., a system, computer program product, and/or other device), a method, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as Java, Perl, Smalltalk, C++ or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or apparatuses (the term "apparatus" including systems and computer program products). It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

According to embodiments of the invention described herein, various systems, apparatus, methods, and computer program products are herein described for electronic mail (email) attachment hold and dispatch for security monitoring of email attachments. Specifically, embodiments of the invention provide for removing email attachments from emails containing such, holding the removed attachments in storage prior to delivering the email to the recipient and communicating the email to the intended recipient absent the attachment, but rather with a link or other means by which the email recipient can retrieve the attachment from the storage. Such a procedure not only allows for the attachment to be analyzed for threats prior to transferring the attachment to the email recipient, but also provides for a means by which information pertaining to the retrieval of the attachment by the recipient is logged (e.g., who retrieved the attachment, from which computing device was the attachment retrieved, at what date and time was the attachment retrieved and the like). Such logged information is vital to understanding the severity of a threat (i.e., how many and what computing devices have been exposed to threat and the like).

Referring to FIG. 1, a system 100 is shown for holding and dispatching electronic mail (email) attachments in accordance with embodiments of the present invention. The system includes a plurality of email servers 200 that receive inbound emails from network(s) 110. The network 110 may be an external network, such as the Internet or an internal network (i.e., intranet). Since emails having attachments that are suspicious (e.g., include malware or the like) predominately come from external entities, in most embodiments network 110 will be an external network, such as the Internet.

The email servers 200, or some other computing device (not shown in FIG. 1) in communication with an email server 200, executes email attachment hold and dispatch module 208 that is configured to identify which of the inbound emails include attachments, remove the attachments from all or some of the emails and store the removed attachment in attachment storage 310. In specific embodiments of the invention the module 208 may be configured to remove and store all email attachments received from network 110, while in other embodiments of the invention the module 208 may be configured to impose criteria on which email attachments are removed and stored. Such criteria may include but is not limited to, the size of the email attachment, the source of the email, the subject of the email, whether the body of the email includes links/URLs (Uniform Resource Locators) or the like. In other embodiments of the invention the module 208 may be configured to randomly sample which email attachments undergo removal and storage processing.

Once email attachments have been removed from the emails containing such email attachment hold and dispatch module 208 is further configured to reconfigure the emails to include access to an electronic link, which is linked to the stored attachment or some other means for retrieving the email attachment from the attachment storage 310. In specific embodiments of the invention the electronic link to the stored attachment may be embedded in the body of the emails. In other embodiments of the invention a new attachment is generated that includes an interstitial message, which includes the electronic link to the stored attachment. Once the emails have been reconfigured to include access to the electronic link or some other means for retrieving the email attachment, the reconfigured emails are communicated to the mailbox 330 associated with email recipient.

Once the email recipient accesses the email and activates the link or other means for retrieving the attachment, the email attachment is transferred from the attachment storage 310 to the email recipient's computing device 300. While FIG. 1 shows a personal computer (PC) it should be evident that any computing device, laptop, tablet, mobile/smart telephone or the like having access to the email recipient's mailbox may access the email and retrieve the email attachment.

The email servers 200, or some other computing device (not shown in FIG. 1) in communication with an email server 200, executes email attachment access logging module 248 that is configured to log/record in logged access information storage 320 information associated with the email recipient retrieving the email from the attachment storage 310. Such information may include, but is not limited to, identify of retriever, device from which the attachment was retrieved, the date and time of retrieval, and the like. It should be noted that in other embodiments of the invention the logging process may be included within email attachment hold and dispatch module 208, obviating the need for a standalone module, such as email attachment access logging module 248. The logging of such information related to the retrieval is beneficial in the event that the attachment is subsequently found to be suspicious or otherwise poses a threat in the form of malware/viruses or the like.

Referring to FIG. 2, a block diagram is presented of email server apparatus 200 configured for holding and dispatching of email attachments, in accordance with embodiments of the present invention. The email server apparatus 200, which may comprise one or more computing devices, includes a computing platform 202 having a memory 204 and at least one processor 206 in communication with the memory 204.

Memory 204 may comprise volatile and non-volatile memory, such as read-only and/or random-access memory (RAM and ROM), EPROM, EEPROM, flash cards, or any memory common to computer platforms. Further, memory 204 may include one or more flash memory cells, or may be any secondary or tertiary storage device, such as magnetic media, optical media, tape, or soft or hard disk. Moreover, memory 204 may comprise cloud storage, such as provided by a cloud storage service and/or a cloud connection service.

Further, processor 206 may be an application-specific integrated circuit ("ASIC"), or other chipset, processor, logic circuit, or other data processing device. Processor 206 or other processor such as ASIC may execute an application programming interface ("API") (not shown in FIG. 2) that interfaces with any resident programs or modules, such as email attachment hold and dispatch module 208, email attachment access logging module 248 and routines, sub-modules associated therewith or the like stored in the memory 204 of computing platform 202.

Processor 206 includes various processing subsystems (not shown in FIG. 2) embodied in hardware, firmware, software, and combinations thereof, that enable the functionality of email server apparatus 200 and the operability of the apparatus on a network. For example, processing subsystems allow for initiating and maintaining communications and exchanging data with other networked computing platforms, such as email recipient device 300 attachment storage 310, and logged access information storage 320 (shown in FIG. 1). For the disclosed aspects, processing subsystems of processor 206 may include any subsystem used in conjunction with email configuration management application 208 and related algorithms, sub-algorithms, modules, sub-modules thereof.

Computer platform 202 may additionally include a communications module (not shown in FIG. 2) embodied in hardware, firmware, software, and combinations thereof, that enables communications among the various components of the computing platform 202, as well as between the other networked devices. Thus, communication module may include the requisite hardware, firmware, software and/or combinations thereof for establishing and maintaining a network communication connection with other devices, such as attachment storage 310, logged access information storage 320 and the like.

The memory 106 of email server apparatus 200 stores email attachment hold and dispatch module 208. In other embodiments of the invention, email attachment hold and dispatch module 208 may be stored in other external memory that is accessible to email server apparatus 200. Email attachment hold and dispatch module 208 is configured to receive a plurality of emails 210, in some embodiments all of the inbound external emails received by an enterprise, and identify which of the emails include attachments 220. In response to identifying which of the emails 210 include attachments 220, the module 208 is further configured to implement attachment remover 220 to remove the attachments 222 from the emails 220 (resulting in emails with attachments removed 224). In some embodiments of the invention, the module 208 is configured to remove the attachments from most if not all of the emails that are received and contain an attachment. As previously noted, in other embodiments the module 208 may remove attachments based on criteria, which may be predefined or dynamically defined based on the current security environment. Criteria may include, but it is not limited to, the type of the attachment, the size of the attachment, the source of the email, the subject of the email, the date/time of receipt of the email and the like.

Email attachment hold and dispatch module 208 is further configured to store the removed attachments 222 in attachment storage 226. Attachment storage 226 may be internal to email server apparatus 200 or external from email server apparatus 200. In addition, the module may be configured to include an email identifier with the stored attachment 222 for the purpose of subsequent identifying the email 220/224 associated with the stored attachment 222.

In specific embodiments of the invention, in response to storing the attachment 22 in the attachment storage 226, the attachment is analyzed 228 for suspicious content, such as viruses, malware or the like. Such analysis of the attachment is typically conducted by a module/application external to the email attachment hold and dispatch module 208. In the event the attachment is found to be suspicious, the attachment is deemed to not be accessible to the email recipient; the email recipient may be notified of such and no further processing by the module 208 is performed (i.e., the email is not reconfigured to include access to electronic link for retrieving the attachment).

In response to storing the attachment 22 in attachment storage 226, email attachment hold and dispatch module 208 invokes email reconfigure 230 that is configured to reconfigure the emails 224 which have had their attachments removed to result in emails 232 with access to an electronic link or other means for retrieving the attachment from the attachment storage 226. As previously noted, the reconfigured emails 232 may include an electronic link 234 embedded in the body of the email or a new attachment 236 may be generated that includes an interstitial message having the electronic link disposed therein.

In the instance in which the reconfigured email 232 includes an electronic link 234 embedded in the body of the email there may be a need to provide a means for indicating that the email has an attachment associated with it, so that the email recipient can readily identify the email as being associated with an attachment. Conventional email applications set a flag to indicate that an email includes an attachment. In specific embodiments of the invention, an empty payload attachment may be attached to the reconfigured email 232 so that the email application sets the requisite attachment flag. In other embodiments of the invention, in which the email application allows for such, reconfiguration may include setting the attachment indicator (i.e., invoking the flag or the like) even though the reconfigured email 232 does not actually include an attachment.

Email attachment hold and dispatch module 208 includes email communicator 238 that is configured to communicate the reconfigured email 232 to the mailbox 240 of the email recipient. In addition, attachment hold and dispatch module 208 includes attachment retriever 242 that is configured to, upon activation 244 of the electronic link, transfer 246 the attachment 222 from the attachment storage 226 to the computing device (300 of FIG. 1) from which the link was activated. In specific embodiments in which the recipient activates the link immediately upon receipt of the email, the initial analysis/scan 228 of the email attachment for suspicious content may have not yet been completed, since in certain instances analysis can take up to 5-7 minutes to complete. In such instances in which the analysis 228 has yet to be completed, the module 208 may be configured to present the recipient with an alert notifying the recipient that the analysis has yet to be completing. Such alert may be configured to include a dynamic status bar or the like that indicates the progress of the analysis 228/time to completion of the analysis 228 or the like.

In specific embodiment of the invention, activation 244 of the link may result in an additional analysis 228 of the attachment for suspicious content. Analyzing 228 the attachment for suspicious content at the time that the attachment is retrieved takes into account the fact that the attachment may be retrieved hours or days after the email was originally received by the server (i.e., hours or days after the original analysis 228/scan for suspicious and the fact that virus definitions may be updated so frequently (e.g., every 30 minutes). As such, the original analysis 228 for suspicious content at the time the attachment was removed and stored may have not resulted in any suspicious content, yet a subsequent analysis 228 for suspicious content may result in suspicious content based on newly updated virus definitions and the like.

Memory 204 of email server apparatus 200 additionally includes email attachment access logging module 248 that is configured to log information related to the retrieval of the attachment in attachment retrieval log 250. By storing the attachments 222 in attachment storage it is possible to determine whether or not the attachment has been retrieved and information about the retrieval, which can then be stored in attachment retrieval log 250. Such information includes, but is not limited to, the identity 252 of the retriever, the device 254 from which the attachment was retrieved and the date/time 256 of the retrieval. The logging of information related to the accessing of the attachments may be beneficial in the event that the attachment is subsequently found to include suspicious content (i.e., viruses, malware) or the like.

Referring to FIG. 3, a flow diagram is presented of a method 400 for holding and dispatching email attachments for, in accordance with embodiments of the present invention. At Event 402, upon receiving inbound emails, typically from an external network, such as the Internet or the like, emails are identified that include attachments. At Event 404, some, if not all, of the attachments are removed from the emails and placed in attachment storage. In specific embodiments most, if not all attachments will be removed and stored, while in other embodiments criteria may be applied to determine which attachments qualify for removal and storage. At optional Event 406, once the attachments are removed and stored, the attachments are analyzed/scanned for suspicious content, such as viruses, malware or the like.

Once the attachments have been removed from the emails, at Event 408, the emails are reconfigured or transformed to include an access to an electronic link, which, when activated, retrieves the attachment from the storage. In certain embodiments in which the email included multiple attachments, multiple links may be included or, in other embodiments, one single link may provide access to retrieving all of the email attachments. In specific embodiments, reconfiguration may include embedding the link within the body of the email. In such embodiments, reconfiguration may also including generating and including with the email an empty-payload attachment for the purpose providing an attachment indicator/flag with the email or, where applicable, setting the indicator to indicate inclusion of an attachment even though an attachment is not included. In other specific embodiments, reconfiguration may include generating and inserting in the email, a new attachment that includes an interstitial message having the electronic link embedded therein. In such embodiments, the new attachment serves to set the attachment indicator, so that recipient is aware that the email includes an attachment. At Event 410, the reconfigured emails are communicated to the mailboxes of the email recipients.

At Event 412, in response to the email recipients accessing the emails and activating the electronic link, the email attachment is retrieved (i.e., transferred from the attachment storage to the computing device on which the link was activated). At optional Event 414, activation of the link may result in further analysis/scanning of the attachment for suspicious content prior to transferring the attachment to the computing device. Such further analysis may be a partial analysis/scan conducted in much less time than the initial/original analysis. The analysis/scanning just prior to transferring insures that any new virus definitions appearing since the initial analysis are encountered for.

At Event 414, information associated with the retrieval of the attachment from the storage is logged. Such information may include, but is not limited to, device on which the attachment is transferred to, identity of email recipient and/or retriever, date/time of retrieval and the like. As previously noted, such logged information may be instrumental to investigative entities in the event the attachment is subsequently found to be suspicious or otherwise poses a threat.

Thus, systems, apparatus, methods, and computer program products described above provide for holding and dispatching of electronic mail (email) attachments for security monitoring of email attachments. As described, embodiments provide for removing email attachments from emails containing such, holding the removed attachments in storage prior to delivering the email to the recipient and communicating the email to the intended recipient absent the attachment, but rather with a link or other means by which the email recipient can retrieve the attachment from the storage. Such a procedure not only allows for the attachment to be analyzed for threats prior to transferring the attachment to the email recipient, but also provides for a means by which information pertaining to the retrieval of the attachment by the recipient is logged.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for electronic mail (email) attachment hold and dispatch, the system comprising:
    an attachment storage device having a first memory and at least one first processor in communication with the first memory;
    one or more email servers having a second memory device with computer-readable program code stored thereon and at least one second processor in communication with the second memory device, wherein the at least one second processor is configured to execute the computer-readable program code to:
        upon receipt of emails by the one or more email servers, identify emails that include attachments;
        remove the attachments from the emails that include attachments;
        store the removed attachments in the first memory of the attachment storage device, wherein the removed attachments are stored in the attachment storage device such that each of the removed attachments include an email identifier corresponding to the email associated with the removed attachment;
        reconfigure the emails with attachments removed to include access to an electronic link to the removed attachment for constructing reconfigured emails, wherein reconfiguring the emails with attachments removed further comprises:
            performing, for each of the emails with attachments removed, a first analysis of the removed attachment to identify whether the removed attachment comprises predetermined suspicious content;
            in response to determining that the removed attachment does not comprise the predetermined suspicious content, generating a new attachment for each of the emails with attachments removed, wherein the generated new attachment is (i) an empty payload attachment or (ii) an interstitial message having the electronic link to the associated removed attachment; and
            attaching, for each of the emails with attachments removed, the generated new attachment to the email with attachments removed;
        communicate the reconfigured emails to electronic mailboxes of associated email recipients, wherein each of the reconfigured emails comprise the associated generated new attachment;
        in response to the email recipients accessing the reconfigured emails and activating the electronic link from a computing device to retrieve the removed attachment, transfer the removed attachment from the first memory of the attachment storage device to the computing device, wherein transferring the removed attachment from the first memory of the attachment storage device further comprises:
            in response to the email recipients activating the electronic link and prior to transferring the removed attachment, performing, for each of the reconfigured emails, an updated second analysis of the removed attachment to identify whether the removed attachment comprises updated suspicious content, wherein the updated suspicious content comprises new suspicious content identified after the first analysis of the removed attachment;
            presenting, on the computing device, a dynamic status bar associated with the updated second analysis, wherein the dynamic status bar comprises a progress of the analysis and a time to completion of the updated second analysis; and
            transferring the removed attachment from the first memory of the attachment storage device to the computing device based on determining that the removed attachment does not comprise the updated suspicious content;
        wherein the suspicious content comprises at least one of predetermined malware content and predetermined virus content; and
        log information associated with the email recipient activating the electronic link to transfer the removed attachment from the first memory of the attachment storage device to the computing device.

2. The system of claim 1, wherein the at least one second processor is further configured to execute the computer-readable program code to:
    access the first memory of the attachment storage device to analyze the removed attachments for the predetermined suspicious content upon receipt of the removed attachments in the first memory; and in response to determining that a first attachment of the removed attachments comprises the predetermined suspicious content, transmit a notification to a first recipient of the first attachment that the first attachment is not accessible.

3. The system of claim 1, wherein the at least one second processor is further configured to execute the computer-readable program code to, in response to an email recipient activating the electronic link prior to the at least one second processor completing the updated second analysis of the removed attachment, alert the email recipient that the attachment is currently inaccessible.

4. The system of claim 1, wherein the at least one second processor is further configured to execute the computer-readable program code to log the information associated with the email recipient activating the electronic link such that the information includes one or more of identity of individual that transferred the removed attachment, identity of the computing device to which the removed attachment was transferred and date and time that the removed attachment was transferred.

5. The system of claim 1, wherein the at least one second processor is further configured to execute the computer-readable program code to reconfigure the emails with attachments removed by embedding the electronic link to the removed attachment in the email.

6. The system of claim 5, wherein the empty payload attachment, for each of the reconfigured emails comprising the empty payload attachment, is structured to activate an attachment indicator flag of the reconfigured email.

7. The system of claim 5, wherein the at least one second processor is further configured to execute the computer-readable program code to set an indicator flag in the reconfigured email to notify the email recipient that the reconfigured email includes an attachment.

8. The system of claim 1, wherein removing the attachments from the emails further comprises:

identifying a first email of the emails that include attachments based on (i) determining that the first email matches predetermined criteria, or (ii) randomly sampling the emails that include attachments, wherein the predetermined criteria comprise at least one of size of the email attachment, source of the email, subject of the email, and presence of an URL in a body of the email, wherein the first email comprises a first attachment; and removing the first attachment from the first email and storing the first attachment in the first memory of the attachment storage device.

9. A computer-implemented method for electronic mail (email) attachment hold and dispatch, the method comprising:

upon receiving emails at an email server, identifying, by a computing device processor, emails that include attachments;

removing, by a computing device processor, the attachments from the emails that include attachments;

storing, by a computing device processor, the removed attachments in a first memory of an attachment storage device, wherein the removed attachments are stored in the attachment storage device such that each of the removed attachments include an email identifier corresponding to the email associated with the removed attachment;

reconfiguring, by a computing device processor, the emails with attachments removed to include access to an electronic link to the removed attachment for constructing reconfigured emails, wherein reconfiguring the emails with attachments removed further comprises:

performing, for each of the emails with attachments removed, a first analysis of the removed attachment to identify whether the removed attachment comprises predetermined suspicious content;

in response to determining that the removed attachment does not comprise the predetermined suspicious content, generating a new attachment for each of the emails with attachments removed, wherein the generated new attachment is (i) an empty payload attachment or (ii) an interstitial message having the electronic link to the associated removed attachment; and attaching, for each of the emails with attachments removed, the generated new attachment to the email with attachments removed;

communicating, by a computing device processor, the reconfigured emails to electronic mailboxes of associated email recipients, wherein each of the reconfigured emails comprise the associated generated new attachment;

in response to the email recipients accessing the reconfigured emails and activating the electronic link, transferring, by a computing device processor, the removed attachment from the attachment storage device to a computing device from which the email recipient activated the electronic link, wherein transferring the removed attachment from the first memory of the attachment storage device further comprises:

in response to the email recipients activating the electronic link and prior to transferring the removed attachment, performing, for each of the reconfigured emails, an updated second analysis of the removed attachment to identify whether the removed attachment comprises updated suspicious content, wherein the updated suspicious content comprises new suspicious content identified after the first analysis of the removed attachment;

presenting, on the computing device, a dynamic status bar associated with the updated second analysis, wherein the dynamic status bar comprises a progress of the analysis and a time to completion of the updated second analysis; and transferring the removed attachment from the first memory of the attachment storage device to the computing device based on determining that the removed attachment does not comprise the updated suspicious content;

wherein the suspicious content comprises at least one of predetermined malware content and predetermined virus content; and logging, by a computing device processor, information associated with the email recipient activating the electronic link to transfer the removed attachment from the attachment storage device to the computing device.

10. The method of claim 9, further comprising, in response to storing the removed attachments in the attachment storage device:

accessing, by a computing processor, the attachment storage device to analyze the removed attachments for the predetermined suspicious content; and in response to determining that a first attachment of the removed attachments comprises the predetermined suspicious content, transmitting a notification to a first recipient of the first attachment that the first attachment is not accessible.

11. The method of claim 9, wherein logging further comprises logging the information such that the information includes one or more of identity of individual that transferred the removed attachment, identity of the computing device to which the removed attachment was transferred and date and time that the removed attachment was transferred.

12. The method of claim 9, wherein reconfiguring the emails further comprises reconfiguring, by the computing device processor, the emails with attachments removed by embedding the electronic link to the removed attachment in the email.

13. The method of claim 9, wherein removing the attachments from the emails further comprises:
   identifying a first email of the emails that include attachments based on (i) determining that the first email matches predetermined criteria, or (ii) randomly sampling the emails that include attachments, wherein the predetermined criteria comprise at least one of size of the email attachment, source of the email, subject of the email, and presence of an URL in a body of the email, wherein the first email comprises a first attachment; and
   removing the first attachment from the first email and storing the first attachment in the first memory of the attachment storage device.

14. A computer program product for electronic mail (email) attachment hold and dispatch, comprising:
   a non-transitory computer-readable medium comprising:
      a first set of codes for causing a computer to upon receiving emails at an email server, identifying emails that include attachments;
      a second set of codes for:
         causing a computer to remove the attachments from the emails that include attachments; and
         causing a computer to store the removed attachments in a first memory of an attachment storage device, wherein the removed attachments are stored in the attachment storage device such that each of the removed attachments include an email identifier corresponding to the email associated with the removed attachment;
      a third set of codes for causing a computer to reconfigure the emails with attachments removed to include access to an electronic link to the removed attachment for constructing reconfigured emails, wherein reconfiguring the emails with attachments removed further comprises:
         performing, for each of the emails with attachments removed, a first analysis of the removed attachment to identify whether the removed attachment comprises predetermined suspicious content;
         in response to determining that the removed attachment does not comprise the predetermined suspicious content, generating a new attachment for each of the emails with attachments removed, wherein the generated new attachment is (i) an empty payload attachment or (ii) an interstitial message having the electronic link to the associated removed attachment; and
         attaching, for each of the emails with attachments removed, the generated new attachment to the email with attachments removed;
      a fourth set of codes for causing a computer to communicate the reconfigured emails to electronic mailboxes of associated email recipients, wherein each of the reconfigured emails comprise the associated generated new attachment;
      a fifth set of codes for causing a computer to, in response to the email recipients accessing the reconfigured emails and activating the electronic link, transfer the removed attachment from the attachment storage device a computing device from which the email recipient activated the electronic link, wherein transferring the removed attachment from the first memory of the attachment storage device further comprises:
         in response to the email recipients activating the electronic link and prior to transferring the removed attachment, performing, for each of the reconfigured emails, an updated second analysis of the removed attachment to identify whether the removed attachment comprises updated suspicious content, wherein the updated suspicious content comprises new suspicious content identified after the first analysis of the removed attachment;
         presenting, on the computing device, a dynamic status bar associated with the updated second analysis, wherein the dynamic status bar comprises a progress of the analysis and a time to completion of the updated second analysis; and
         transferring the removed attachment from the first memory of the attachment storage device to the computing device based on determining that the removed attachment does not comprise the updated suspicious content;
         wherein the suspicious content comprises at least one of predetermined malware content and predetermined virus content; and
      a sixth set of codes for causing a computer to log information associated with the email recipient activating the electronic link to transfer the removed attachment from the attachment storage device to the computing device.

15. The computer program product of claim 14, further comprising a seventh set of codes for causing a computer to, in response to storing the removed attachments in the attachment storage device:
   access the attachment storage device to analyze the removed attachments for the predetermined suspicious content; and
   in response to determining that a first attachment of the removed attachments comprises the predetermined suspicious content, transmit a notification to a first recipient of the first attachment that the first attachment is not accessible.

16. The computer program product of claim 14, wherein the sixth set of codes for causing is further configured to log the information associated with the email recipient activating the electronic link to transfer the removed attachment from the attachment storage device to the computing device, such that, the information includes one or more of identity of individual that transferred the removed attachment, identity of the computing device to which the removed attachment was transferred and date and time that the removed attachment was transferred.

17. The computer program product of claim 14, wherein the second set of codes for removing the attachments from the emails is further configured to:
   identify a first email of the emails that include attachments based on (i) determining that the first email matches predetermined criteria, or (ii) randomly sampling the emails that include attachments, wherein the predetermined criteria comprise at least one of size of the email attachment, source of the email, subject of the email, and presence of an URL in a body of the email, wherein the first email comprises a first attachment; and
remove the first attachment from the first email and storing the first attachment in the first memory of the attachment storage device.

* * * * *